(12) United States Patent
Cornet et al.

(10) Patent No.: US 8,231,714 B2
(45) Date of Patent: Jul. 31, 2012

(54) COMBINED PUMPING AND SEPARATING MACHINE FOR THE OIL CIRCUIT OF A TURBOJET

(75) Inventors: Albert Cornet, Verviers (BE); Nicolas Raimarckers, Tourinne (BE)

(73) Assignee: Techspace Aero S.A., Milmort (BG)

( * ) Notice: Subject to any disclaimer, the term of this patent is extended or adjusted under 35 U.S.C. 154(b) by 265 days.

(21) Appl. No.: 12/643,388

(22) Filed: Dec. 21, 2009

(65) Prior Publication Data

US 2010/0162889 A1 Jul. 1, 2010

(30) Foreign Application Priority Data

Dec. 22, 2008 (EP) .................................. 08172593

(51) Int. Cl.
*B01D 19/00* (2006.01)
(52) U.S. Cl. ............... 95/258; 95/261; 96/214; 96/217; 96/219; 96/213; 184/6.23
(58) Field of Classification Search .................. 95/261, 95/258; 96/214, 217, 219, 213; 184/6.23
See application file for complete search history.

(56) References Cited

U.S. PATENT DOCUMENTS

| | | | |
|---|---|---|---|
| 1,345,895 A | | 7/1920 | Seguin |
| 2,725,956 A | * | 12/1955 | Cunningham ............... 184/6.23 |
| 3,240,003 A | | 3/1966 | Stroup et al. |
| 4,198,218 A | | 4/1980 | Erickson |
| 4,600,413 A | | 7/1986 | Sugden |
| 5,861,052 A | * | 1/1999 | Meinander ....................... 95/243 |
| 6,341,667 B1 | * | 1/2002 | Ahlbom et al. ............... 184/6.23 |
| 2008/0217105 A1 | * | 9/2008 | Streifinger ................... 184/6.23 |

FOREIGN PATENT DOCUMENTS

| | | |
|---|---|---|
| EP | 0298442 A2 | 1/1989 |
| JP | 60014921 A | 1/1985 |

* cited by examiner

*Primary Examiner* — Duane Smith
*Assistant Examiner* — Douglas Theisen
(74) *Attorney, Agent, or Firm* — Reinhart Boerner Van Deuren P.C.

(57) ABSTRACT

A combined machine for pumping and separating into two distinct and purified phases a two-phase liquid/gas mixture or fluid, is provided. A first stage of the combined machine is equipped with an intake for the two-phase fluid, in which the two-phase fluid is sucked, pumped and partially separated into two distinct phases. One phase is mainly liquid and the other phase is mainly gaseous. A second stage of the combined machine includes two zones, which includes a first zone and a second zone. In the first zone, the mainly liquid phase extracted from the first stage is degassed. In the second zone, the mainly gaseous phase extracted from the first stage is dried. In a third stage of the combined machine, the degassed liquid is forced back and pressurized.

16 Claims, 2 Drawing Sheets

COMBINED PUMPING AND SEPARATING MACHINE FOR THE OIL CIRCUIT OF A TURBOJET

CROSS-REFERENCE TO RELATED PATENT APPLICATIONS

This patent application claims the benefit of European Application No. 08172593.9 filed Dec. 22, 2008, the entire teachings and disclosure of which are incorporated herein by reference thereto.

FIELD OF THE INVENTION

The present invention relates to a centrifugal machine that can perform, in full or in part, the following four functions:
Suction,
oil removal or, more generally, drying,
deaeration or, more generally, degassing, and
forcing back a gas/liquid mixture.
The mixture comprises for example air and oil, or more generally a light fluid and a heavy fluid.

The machine as in the invention must be able to manage the variations in strength of the mixture upon entry and to allow the acceptance of a mixture of anything from a pure gas to a pure liquid, and must be able to produce the two separated phases of this mixture upon exit.

The technical application field is more particularly that of the oil circuits for the lubrication and cooling of turbine engines.

More generally, the invention relates to any application where the functions of pumping and separating several fluids must be combined. The invention also applies to the separation of a gas/liquid mixture in which the gas/liquid proportion is highly variable.

The invention also relates to a method for the combined pumping and separating within an oil circuit for lubricating and cooling an aircraft engine by the implementation of the above-mentioned machine.

STATE OF THE ART

In existing turbojets, the oil flow is delivered by a pump to the roller bearings, gears and bearings in order to lubricate and cool them. To prevent any oil leaks outside the housing, an air flow taken from the compressor is forced from the outside to the inside of the housing through seals at the interfaces of the engine shaft.

This air is then discarded to the atmosphere by a first specific circuit intended to remove the oil from it and to control the pressure of the housing. The "oil-removal/drying" function is generally performed by means of a specific device, called an oil remover. The latter releases air that is free of oil on one side and on the other releases a two-phase mixture of air and oil to another part of the engine, called a deaerator. Dynamic seals allow to limit this flow taken from the engine, which improves its efficiency.

In addition, the oil injected over the moving parts is collected at the bottom of the housing by "collection" pumps (one per housing), through a second specific circuit. To ensure complete drying of the housing, a small amount of air is also sucked in by this circuit and the mixture thus sucked in by these pumps must be separated before the purified oil, that is without air, is delivered to the tank. This separation operation, called deaeration, is performed by means of a deaerator, which returns on the one hand the purified oil to the tank before it is pumped towards the engine, and on the other hand returns a two-phase mixture of air and oil to the oil remover.

The shared architecture of the oil system of a turbojet as in the state of the art may thus be summarised as follows. The roller bearings, gears and bearings enclosed in the housings are lubricated by means of the oil injected by the feeder pump and collected by the collection pumps. The dynamic seals separate the housing comprising a mixture of air and oil from the rest of the engine. To prevent an oil leak from the housing into the rest of the engine through the seals, the latter are pressurised by means of air coming from the compressor, which creates a constant air flow coming from the outside into the inside of the housing and forcing back the oil. The housing is generally connected to the outside air through the separation system, called an oil remover. The housing is therefore said to be ventilated. In the opposite case where all the air entering through the seals exits through the oil-collection system, the housing is said to be unventilated.

In the oil-collection circuit, the function of the deaerator is on the one hand to prevent problems of cavitation resulting from the presence of air in the oil and on the other to guarantee the quality of the oil, since the inclusion of a gas such as air into the oil may affect the performance of hydraulic systems because the gas introduces some level of compressibility into the hydraulic fluid.

The two above-mentioned separation functions correspond to physically distinct equipment in existing engines. Moreover, the separation system is generally uncoupled from the pumping function. The two-phase fluid passes through a separator that works on the principle of the centrifuging or of settling, allowing to separately collect the two fluids. Separation is achieved thanks to the difference in density of the two fluids. The oil flow is thus ensured by a pump fitted in series on the deaerator. So, in the field of the lubrication of aircraft engines, these systems pose problems as a result of their bulk, their weight and more indirectly as a result of their complex installation.

U.S. Pat. No. 3,240,003 A describes a machine for separating a liquid from a gas flow with which the liquid is mixed, comprising a channel equipped with a widened section in which, in rotation along the axis of the channel, there is a centrifugal separator in the form of a hollow tapered element which allows to collect the liquid by means of centrifugal force, through a porous block crossed by the gas/liquid mixture, in a ring-shaped space on the widest periphery of said tapered element. The liquid is then transferred to a tank by means of a skimming system in the form of a fixed collecting tube, both ends of which are immersed in the ring-shaped space and face the direction opposite to the flow direction of the liquid when the separator rotates. This system does not have a suction function.

Document EP 0 298 442 A2 describes a machine for degassing a fluid to be pumped comprising fibres in suspension in the paper industry. This machine, which is only suited to deaeration, comprises a centrifugal pump in which the gas-extraction channel from the rotor outlet to the gas-outlet channel is equipped with screen surfaces that allow to separate the gas given off by the solid particles carried by the two-phase mixture whilst preventing clogging by these solid particles. The system described in this document is not well suited to major variations in strength of the two-phase mixture as found in turbine engines.

Document JP 60-014921 A describes a machine for separating a gas-liquid mixture, comprising a rotating body, to the centre of which the mixture is introduced and which serves as a centrifugal pump. The droplets of liquid in the mixture are separated by centrifugal force and discarded into a liquid outlet pipe located on the periphery of the machine. The gas separated from the mixture is axially discarded into a gas-outlet pipe. The exhaust gas drives a turbine. The separation efficiency is improved by using a porous body which allows to increase the size of the droplets of the liquid. This machine is mainly suited for the oil removal or drying of a mixture that is rich in gas.

The machines proposed in the state of the art are therefore not efficient across the entire range of proportions of liquid/gas encountered with the two-phase oil/air mixture in the field of a flying aircraft engine. This two-phase mixture may comprise an oil flow contaminated with air bubbles (emulsion) or comprising air pockets (for example when the engine is running at low speed). In particular, a skimming machine would be saturated and would not work well in the case of the flight of a manoeuvring airplane.

More specifically, in aircraft engines, oil removers are known that do not have a suction function and/or a forcing-back function.

In general, whether it be in oil removers or in deaerators, there is no concern for the purity of the discarded phase. Either pure oil is produced on one side and an air/oil mixture is discarded on the other, or pure air is produced and an oil/air mixture is discarded on the other side. Thus, the quality of discarded mixture in the above-mentioned state of the art is not of great concern. This lack of performance with the discarded mixture would lead, when using similar systems, to an oversized equipment and a lack of compactness, whereas this latter aspect is important in onboard aircraft equipment.

AIMS OF THE INVENTION

The present invention aims to overcome the drawbacks of the state of the art.

In particular, the invention aims to improve the overall yield of the oil circuits for lubricating and cooling turbine engines allowing, by means of an improved quality of the air/oil separation, to reduce oil consumption and also reduce weight.

The invention also has the aim of improving the purity of the various fluid phases recovered at the outlet of the machine.

The invention has the further aim of providing a simplified system with reduced weight and bulk.

MAIN CHARACTERISTIC FEATURES OF THE INVENTION

A first aim of the present invention relates to a combined machine for pumping and separating into two distinct and purified phases a liquid/gas mixture or two-phase fluid, preferably oil/air, at the intake of the machine, comprising a means for the suction, pumping and partial separation of the two-phase fluid, a means for drying and extracting the separated gas and a means for degassing and forcing back the separated liquid, comprising at least three stages (A,B,C). According to the invention, these three stages are physically separated and may be operated by a means that is internal or external to the machine and may be mechanical, electrical or other, and built into a single casing. More precisely, there are:
- a first stage (A), equipped with an intake for the two-phase fluid, in which the two-phase fluid is sucked, pumped and partially separated into two distinct phases, one phase being mainly liquid and the other mainly gaseous;
- a second stage (B) comprising two zones:
  - a first zone in which the mainly liquid phase extracted from the first stage (A) is degassed and
  - a second zone, equipped with a first outlet for the dried gas, in which the mainly gaseous phase extracted from the first phase (A) is dried;
- a third stage (C), equipped with a second outlet for the degassed liquid, in which the degassed liquid is forced back and pressurised.

According to preferred embodiments of the invention, the method as in the invention also comprises, in combination, one or several of the following features:
- the first stage (A) comprises at least partially an axial-centrifugal impeller of a tapered shape which may be rotated in a fixed casing of the same shape, linked to a drive shaft positioned along the axis of the machine, the whole assembly being called an "inductor", and which gives the incoming two-phase fluid a pumping pressure and causes the partial centrifugal separation into a mainly liquid phase and a mainly gaseous phase;
- the two zones of the second stage (B) are concentric, the first zone being an essentially ring-shaped buffer on the outer periphery of the second stage (B) which allows to degas or deaerate the mainly liquid phase, and the second zone being an essentially cylindrical zone inside the second stage (B) that allows to dry the mainly gaseous phase or remove the oil from it;
- the first zone of the second stage (B) comprises the outermost part of the inductor, located distally relative to the drive shaft and configured so that the liquid obtained after partial separation and extraction in the first stage (A) is degassed before it is transferred to the third stage (C);
- the second zone of the second stage (B) is rotationally linked to the drive shaft, located proximally relative to said shaft and configured so that the gas charged with droplets of liquid after partial separation and extraction in the first stage (A) has its oil removed by being forced through said second zone and is extracted from the machine through the first outlet;
- the second zone comprises a disc formed of a porous solid body, made for example of metal foam, or drilled with channels from an internal diameter to the outside, or even oil-removal blades;
- the first outlet comprises an axial aperture made in the drive shaft;
- the third stage (C) comprises a volute located distally relative to the drive shaft and configured so that the liquid obtained at the outlet from the first zone of the second stage (B) is pressurised in said volute and forced back through the second outlet;
- the volute is configured so as to maintain while being used a continuous ring of liquid inside it, whatever the composition of the mixture at the intake of the machine;
- the forced-back liquid is axially or tangentially extracted from the volute;
- said volute comprises a valve positioned at the outlet from the volute, said valve having a calibration that only allows liquid to exit, i.e. fluid of higher density;
- in its part distal relative to the axis, the inductor has a radial channel that leads into the volute more or less parallel to the direction of the centrifugal force to which the two-phase fluid is subjected.

A second aim of the present invention relates to a oil circuit for lubricating and cooling an aircraft engine, preferably a turbojet, comprising a combined machine for pumping and separating into two distinct purified phases the two-phase oil/air fluid at the intake of the machine, as described above.

A third aim of the present invention relates to a method for the combined pumping and separation of a two-phase oil/air fluid into two distinct and purified phases, in the oil circuit for lubricating and cooling an aircraft engine, implementing the machine as described above, wherein the respective functions of suction, pumping and partial separation of the two-phase fluid, drying and extracting the separated gas and degassing and forcing back the separated liquid are performed in physically separated stages (A,B,C) in the following manner:

- in the first stage (A), equipped with an intake for the two-phase fluid, the two-phase fluid is sucked, pumped and partially separated into two distinct phases, a mainly liquid phase and a mainly gaseous phase;
- in the first zone of the second stage (B), the mainly liquid phase extracted from the first stage (A) is degassed;
- in the second zone of the second stage (B), the mainly gaseous phase extracted from the first stage (A) is dried and/or filtered, the purified gas being finally extracted through a first outlet;
- in the third stage (C), the purified liquid extracted from the second stage (B) is forced back and pressurised, said purified liquid being finally extracted through a second outlet.

DESCRIPTION OF PREFERRED
EMBODIMENTS OF THE INVENTION

The present invention discloses a machine in which the various above-mentioned functions are separately performed thanks to the use of a particular staging arrangement such as for example (but not restricted to): suction of the liquid/gas mixture, pressurisation, degassing of the mixture, removal of oil from the gas extracted in the previous stage, etc.

Figure 1:
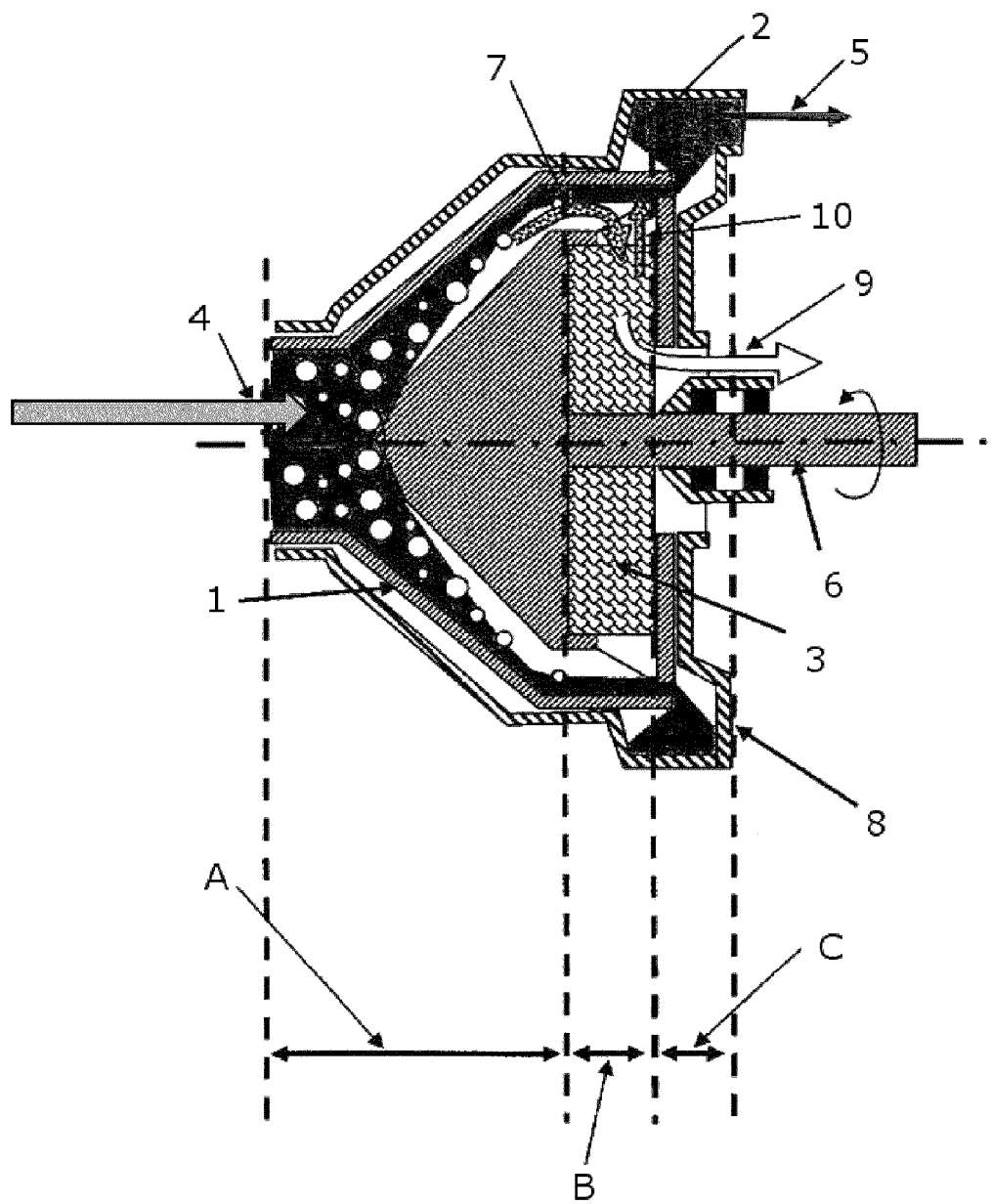
FIG. 1 schematically shows an axial cross-section view of a machine according to a first preferred embodiment of the present invention.

According to a particular embodiment, the present invention discloses in particular a machine such as that shown in FIG. 1, comprising three stages and four zones intended to separately perform the four above-mentioned functions:

- a first stage A corresponding to an axial-centrifugal pumping zone for the air/oil mixture ensuring the suction function with partial separation of the two fluids, called an "inductor";
- a second rotating separation stage B, subdivided into two concentric zones, a first buffer zone which is essentially ring-shaped on the outer periphery of the second stage B, which allow to deaerate the oil, and a second, essentially cylindrical, inner zone that allows to dry (or remove the oil from) the air, and
- a third stage C corresponding to the pumping and final forcing-back zone for the purified oil.

In more detail, the device according to a first preferred embodiment of the invention, shown in FIG. 1, comprises an impeller or rotor 1 with blades, located in a cavity with tapered walls for moving the two-phase fluid to be separated 4, which allows a first axial-centrifugal separation and deaeration within the rotor itself, from a fixed volute 2, i.e. a spiral cavity formed between the fixed casing 8 and the radial end of the rotor and from a disc of metal foam 3 for the final purification of the air. Linking the rotor 1 with a motor that is external to the device (not shown) occurs thanks to an axial mechanical shaft 6.

The first above-mentioned stage A corresponds to the axial-centrifugal impeller 1, which gives the incoming two-phase fluid 4 the pressure required for the subsequent functions. A first axial-radial centrifugal separation already occurs at this level as a result of the action of centrifugal force on the two fluids of different densities (air and oil).

The second stage B corresponds to the means for deaerating and drying the air 7 charged with droplets of liquid in suspension 10.

In a first zone of the second stage B, positioned on the outer periphery, the part of the mixture enriched with oil by the first stage A is deaerated by centrifuging before it is transferred to the third stage C.

The second zone of the second stage B, called oil-removal or drying stage, is positioned close to the axis and rotates. This drying zone may or may not comprise a solid body such as a metal foam 3, through which the air 7 charged with oil passes. The removal of oil from the air is achieved by separating the oil and the air thanks to the differential centrifugal force acting on both phases. Alternatively, the metal foam 3 may be replaced by sets of oil-removal blades. The droplets 10 colliding with a wall of this foam 3 are redirected towards the volute 2 by the centrifugal action of the system. The purified air 9 is axially extracted. The purified air may advantageously be extracted through an axial aperture made in the shaft 6 (not shown). The oil discarded by this oil-removal zone is ejected on the periphery of the zone, which corresponds to the deaeration zone.

It will be noted that the volute 2 may be partly or completely eliminated.

The third zone C allows to force back and pressurise the separated oil. It comprises the outermost part of the impeller 1 and the volute 2, which allows to collect the oil 5 coming out of the second stage B after the oil and the air are completely separated. Zone C is more distant from the axis than zone B. This part also serves as a diffuser, transforming the kinetic energy of the liquid into pressure. The purified oil 5 is axially or tangentially extracted from the volute 2. Therefore, this zone C also has a pumping function.

This equipment and any feeder pump or pumps are preferably driven by a single shaft 6. The invention is advantageously compatible with a mechanical, electrical or other type of drive.

As a further preference, these devices are built into one same casing 8.

As an advantage, the purity of the fluid coming out through the volute, in the present case oil for turbojet cooling and lubrication systems, is improved by the retention of a ring of liquid in the volute 2, regardless of the mixture at the intake of the machine.

The ring of liquid in the volute 2 may also be advantageously retained by means of a valve positioned at the outlet from the volute 2, whose calibration is such that only the fluid with higher density may open it (not shown).

Figure 2:
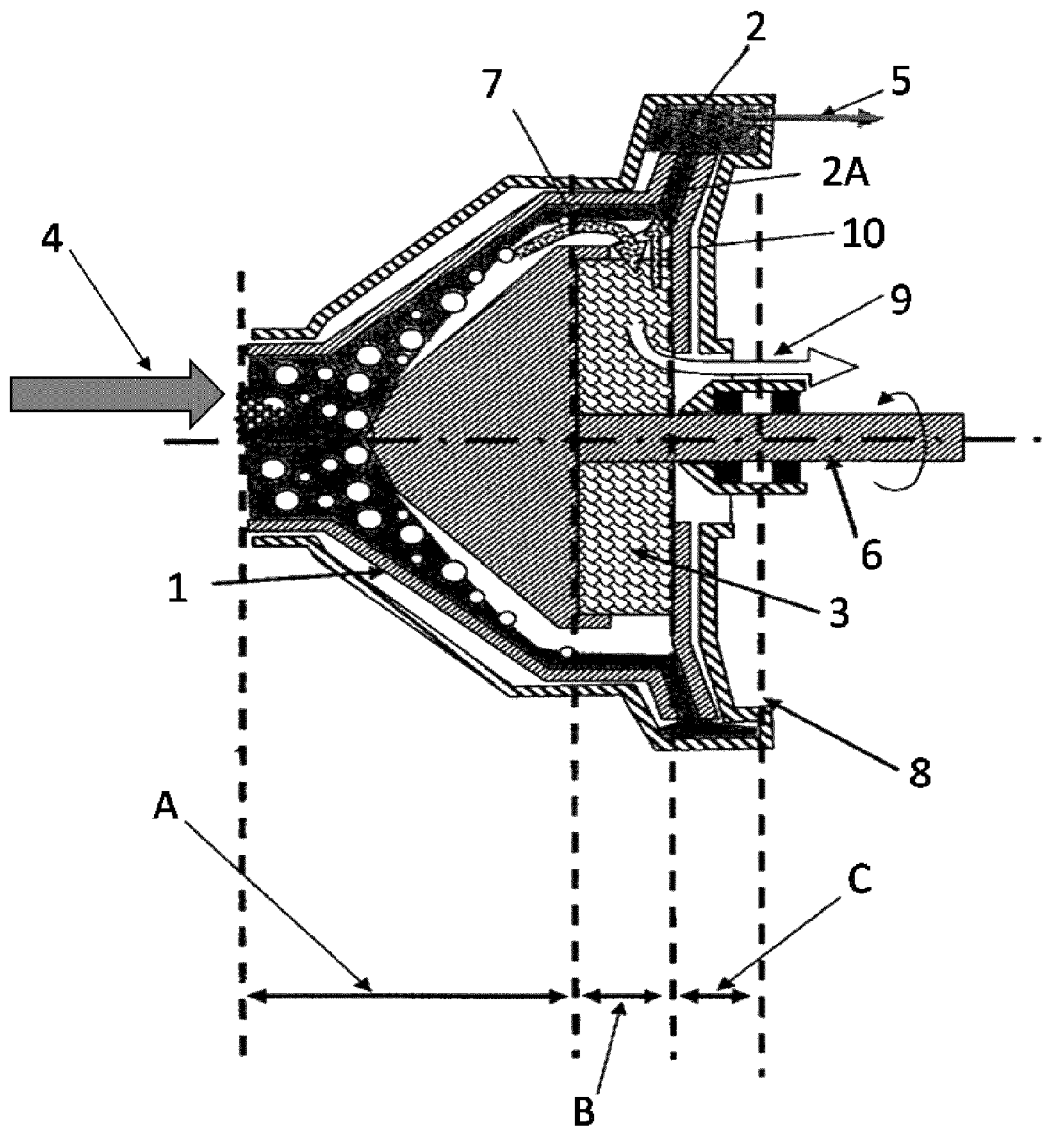
FIG. 2 schematically shows an axial cross-section view of a machine according to a second preferred embodiment of the present invention.

In addition, FIG. 2 shows another embodiment of the invention where the impeller 1 has been configured in its part that is most distant from the axis (the outermost part) in such a way as to allow even more efficient separation of the pure oil. For example, the impeller 1 may have a radial channel 2A emerging more or less parallel to the direction of the centrifugal force in the volute 2. This embodiment also aims to reduce the risks of the separated oil flowing back from the volute to the inside of the machine.

In this way the invention allows to limit the risk of formation and expulsion of an air lock at the level of the volute.

As an advantage, the device as in the invention may be incorporated into existing lubrication units in aircraft engines.

ADVANTAGES OF THE INVENTION

In response to the problems of linking the two separation functions required for obtaining the two purest phases possible in one single device, the invention proposes a buffer zone allowing to manage the variations in mixture strength and hence to accept a mixture of anything from a pure gas to a pure liquid, and therefore allows to separately obtain the two phases of this mixture. Obtaining these pure phases represents an advance from the point of view of the impact on the environment by limiting the oil consumption, i.e. discarding oil with the air.

Another advantage of the invention is the regulation of the exit pressure of the oil as well as the achievement of sufficient but not excessive pressure at the outlet by distancing the volute relative to the rotation axis of the impeller. Moreover, this allows to maintain a continuous circular layer of liquid (oil), facilitating changes in engine speed and flow patterns.

The invention claimed is:

1. Combined machine for pumping and separating into two distinct and purified phases a two-phase liquid/gas mixture or fluid at the intake of the machine, comprising means for the suction, pumping and partial separation of the two-phase fluid, means for drying and extracting the separated gas and means for degassing and forcing back the separated liquid, comprising at least three physically separated stages (A,B,C), intended to be activated by a means that is internal or external to the machine and built into a single casing (8):
    a first stage (A), equipped with an intake (4) for the two-phase fluid, in which the two-phase fluid is sucked, pumped and partially separated into two distinct phases, one phase being mainly liquid and the other being mainly gaseous;
    a second stage (B), comprising two zones:
        a first zone in which the mainly liquid phase extracted from the first stage (A) is degassed, and
        a second zone, equipped with a first outlet (9) for the dried gas, in which the mainly gaseous phase extracted from the first stage (A) is dried;
    a third stage (C), equipped with a second outlet (5) for the degassed liquid, in which the degassed liquid is forced back and pressurised.

2. The machine as in claim 1, wherein the first stage (A) comprises at least partially an axial-centrifugal impeller of tapered shape (1) that may be rotated in a fixed casing (8) of the same shape, linked to a drive shaft (6) positioned along the axis of the machine, the whole assembly being called an "inductor", and that gives the incoming two-phase fluid a pumping pressure and causes the partial centrifugal separation into a mainly liquid phase and a mainly gaseous phase.

3. The machine as in claim 1, wherein the two zones of the second stage (B) are concentric, the first zone being an essentially ring-shaped buffer on the outer periphery of the second stage (B) which allows to degas or deaerate the mainly liquid phase, and the second zone being an essentially cylindrical zone inside the second stage (B) that allows to dry the mainly gaseous phase or remove the oil from it.

4. The machine as in claim 2, wherein the first zone of the second stage (B) comprises the outermost part of the inductor (1), located distally relative to the drive shaft (6) and configured so that the liquid obtained after partial separation and extraction in the first stage (A) is degassed before it is transferred to the third stage (C).

5. The machine as in claim 1, wherein the second zone of the second stage (B) is rotationally linked to the drive shaft (6), located proximally relative to said shaft (6) and configured so that the gas charged with droplets of liquid after partial separation and extraction in the first stage (A) has its oil removed by forced passage in said second zone and is extracted from the machine through the first outlet (9).

6. The machine as in claim 5, wherein the second zone comprises a disc made of a solid body that is porous or drilled with channels of internal diameter to the outside, or of sets of oil-removal blades.

7. The machine as in claim 5, wherein the first outlet (9) comprises an axial aperture made in the drive shaft (6).

8. The machine as in claim 1, wherein the third stage (C) comprises a volute (2), located distally relative to the drive shaft (6) and configured so that the liquid obtained at the outlet from the first zone of the second stage (B) is pressurised in said volute (2) and forced back through the second outlet (5).

9. The machine as in claim 8, wherein the volute (2) is configured so as to maintain while being used a continuous ring of liquid inside it, whatever the composition of the mixture at the intake of the machine.

10. The machine as in claim 8, further comprising means for axially or tangentially extracting the forced-back liquid (5) from the volute (2).

11. The machine as in claim 9, wherein said volute (2) comprises a valve positioned at the outlet from the volute (2), said valve being calibrated so as to only allow liquid to exit, i.e. fluid with the higher density.

12. The machine as in claim 9, wherein the first stage (A) comprises at least partially an axial-centrifugal impeller of tapered shape (1) that may be rotated in a fixed casing (8) of the same shape, linked to a drive shaft (6) positioned along the axis of the machine, the whole assembly being called an "inductor", and that gives the incoming two-phase fluid a pumping pressure and causes the partial centrifugal separation into a mainly liquid phase and a mainly gaseous phase; and
    wherein the inductor (1) comprises on its distal part relative to the axis a radial channel (2A) emerging in the volute (2) more or less parallel to the direction of the centrifugal force to which the two-phase fluid is subjected.

13. Oil circuit for lubricating and cooling an aircraft engine comprising a combined machine for pumping and separating into two distinct and purified phases the two-phase oil/air fluid at the intake of the machine, as in claim 1.

14. Method for achieving combined pumping and separation of a two-phase oil/air fluid into two distinct and purified phases, in an oil circuit for lubricating and cooling an aircraft engine, implementing the machine as in claim 1, wherein, in physically separated stages (A,B,C), the respective functions of suction, pumping and partial separation of the two-phase fluid, drying and extraction of the gas separated and degassing and forcing back of the separated liquid are performed in the following manner:
    in the first stage (A), equipped with an intake (4) for the two-phase fluid, the two-phase fluid is sucked, pumped and partially separated into two distinct phases, one phase being mainly liquid and the other mainly gaseous;
    in the first zone of the second stage (B), the mainly liquid phase extracted from the first stage (A) is degassed;
    in the second zone of the second stage (B), the mainly gaseous phase extracted from the first stage (A) is dried, the purified gas being finally extracted through a first outlet (9);

in the third stage (C), the purified liquid extracted from the second stage (B) is forced back and pressurised, said purified liquid being finally extracted through a second outlet (5).

15. The combined machine of claim 1, wherein the two-phase liquid/gas mixture is an oil/air mixture.

16. The oil circuit of claim 13, wherein the aircraft engine is a turbojet.

* * * * *